Figure 1:
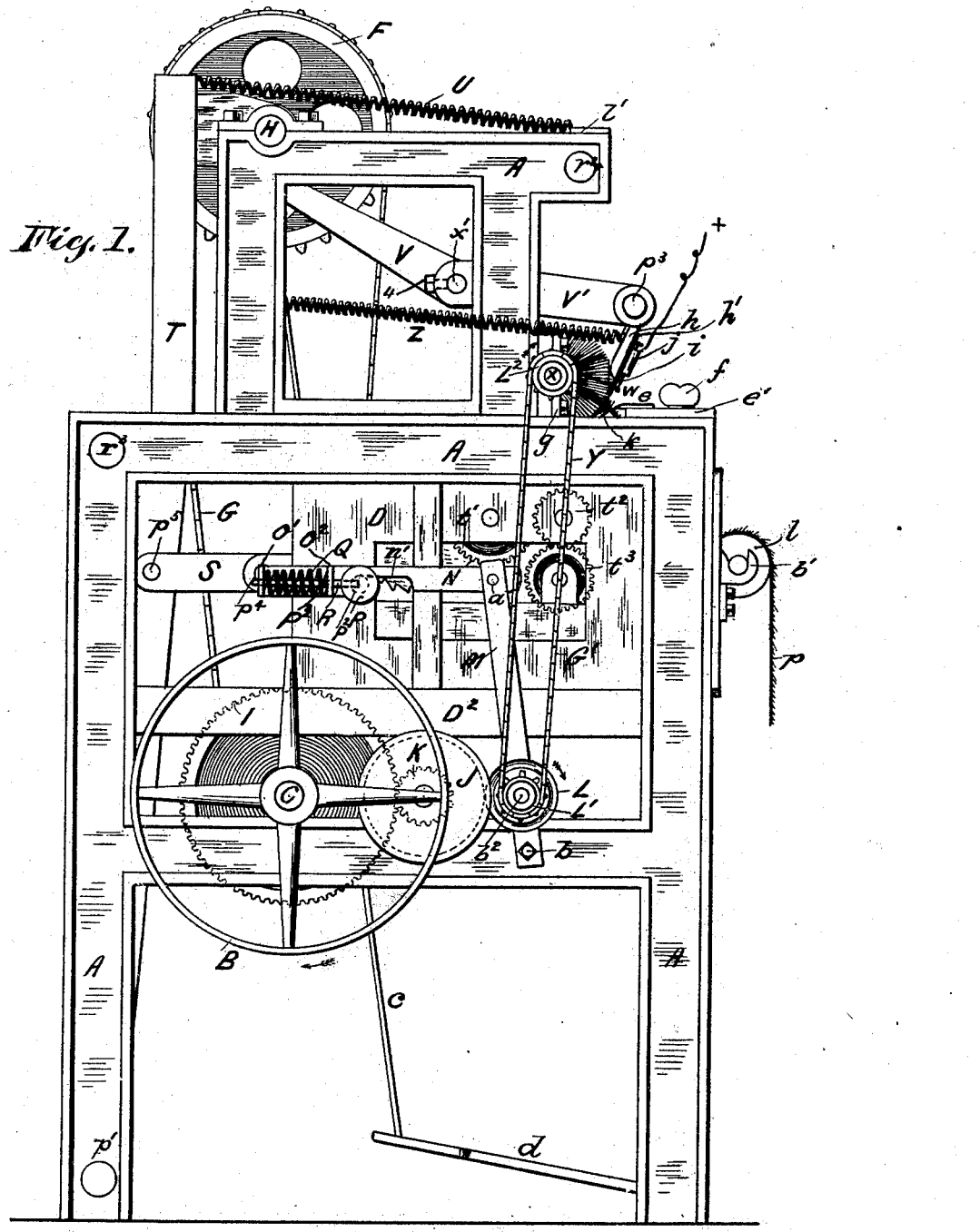

(No Model.) 6 Sheets—Sheet 1.
E. R. KNOWLES.
MACHINE FOR REMOVING WATER HAIRS FROM PELTS.
No. 502,366. Patented Aug. 1, 1893.

Witnesses:
D. W. Gardner
E. V. Myers

Inventor:
Edward R. Knowles
By Ernest Andrbl
his Attorney (No Model.) 6 Sheets—Sheet 2.
E. R. KNOWLES.
MACHINE FOR REMOVING WATER HAIRS FROM PELTS.
No. 502,366. Patented Aug. 1, 1893.

Witnesses:
D. W. Gardner
E. V. Myers

Inventor:
Edward R. Knowles
By Ernest C. Webb
His Attorney (No Model.)

E. R. KNOWLES.
MACHINE FOR REMOVING WATER HAIRS FROM PELTS.

No. 502,366. Patented Aug. 1, 1893.

UNITED STATES PATENT OFFICE.

EDWARD R. KNOWLES, OF BROOKLYN, ASSIGNOR TO LOUIS WERNER, OF NEW YORK, N. Y.

MACHINE FOR REMOVING WATER-HAIRS FROM PELTS.

SPECIFICATION forming part of Letters Patent No. 502,366, dated August 1, 1893.

Application filed April 17, 1890. Renewed January 17, 1893. Serial No. 458,738. (No model.)

*To all whom it may concern:*

Be it known that I, EDWARD R. KNOWLES, a citizen of the United States, residing at Brooklyn, in the county of Kings and State of New York, have invented new and useful Improvements in Machines for Removing Water-Hairs from Pelts, of which the following is a description.

This invention relates to improvements in machines for treating pelts to remove the stiff water hairs without injury to the soft fur or wool, and is particularly designed for treating seal skins. The machines heretofore used for this purpose may be said to consist of two classes: first, machines in which the separation of the fur and water hairs prior to the plucking, clipping or removing operation, is accomplished by means of an air current or blast properly directed upon that portion of the pelt presented for treatment; and secondly, machines in which this separation is obtained by the brushing action of a rotating brush. A notable example of machines of the first or air blast class will be found in Letters Patent of the United States No. 240,007, granted April 12, 1881, to Gustav Cimiotti and Ferdinand F. Cimiotti; and a notable example of machines of the second class, in which a brushing action is relied upon to separate the fur and water hairs, will be found in United States Letters Patent No. 408,879, granted August 13, 1889, to Anton Hedbavny.

My machine, which forms the subject matter of this application, belongs to the second class, and has for its object improvements in the construction, arrangement and operation of such machines.

To this end, my invention consists of a machine for removing the stiff water hairs from pelts, comprising, a frame carrying a knife-edged bar, and a serrated guard-comb arranged in front of said bar, means for stretching and intermittently feeding the pelt over said bar, and means for imparting a reciprocating motion to said frame, in combination with an intermittently rotating brush arranged back of the knife-edged bar and opposite to the comb, and means for removing the water hairs, all arranged and operating substantially as hereinafter described and pointed out in the claims. Before proceeding, however, to describe the details of construction of my machine, I desire to say that I prefer to use as the "means for removing water hairs" a metallic conductor heated to incandescence by an electric current, said conductor being preferably in the form of a tense wire arranged above the knife-edged bar in such manner that it will have a substantially intermittent oscillating movement to and from said bar during the operation of the machine.

Figure 2:
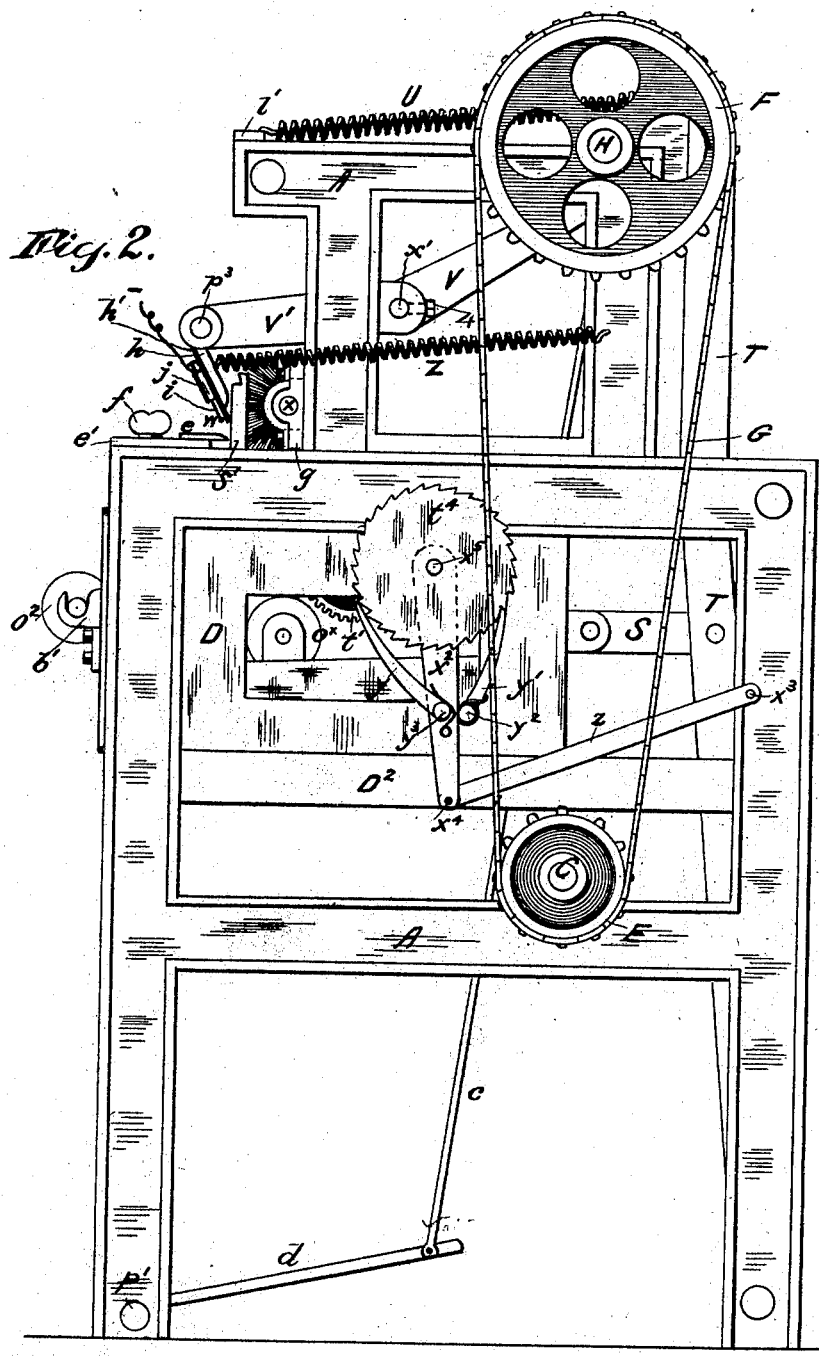
Figure 3:
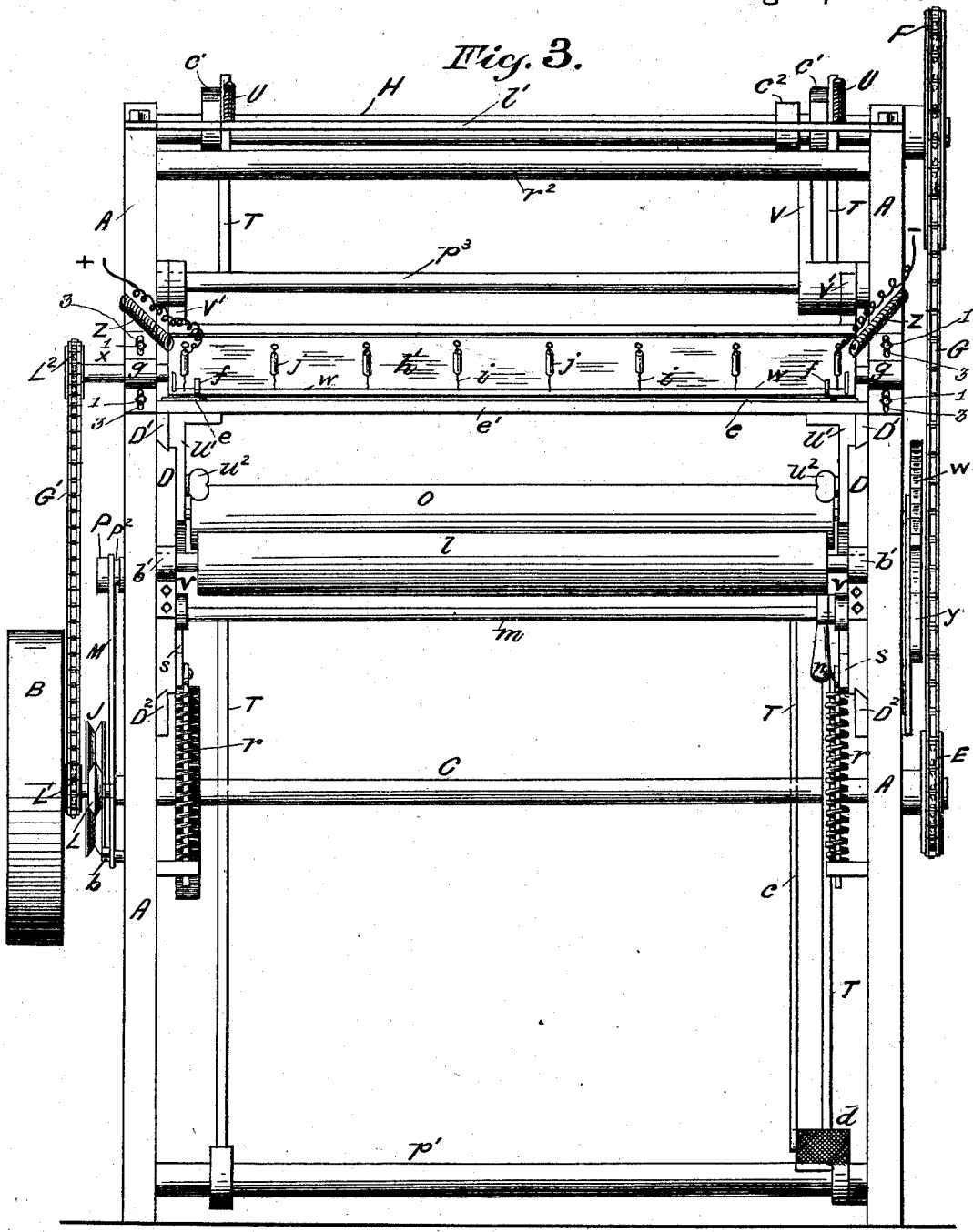
Figure 4:
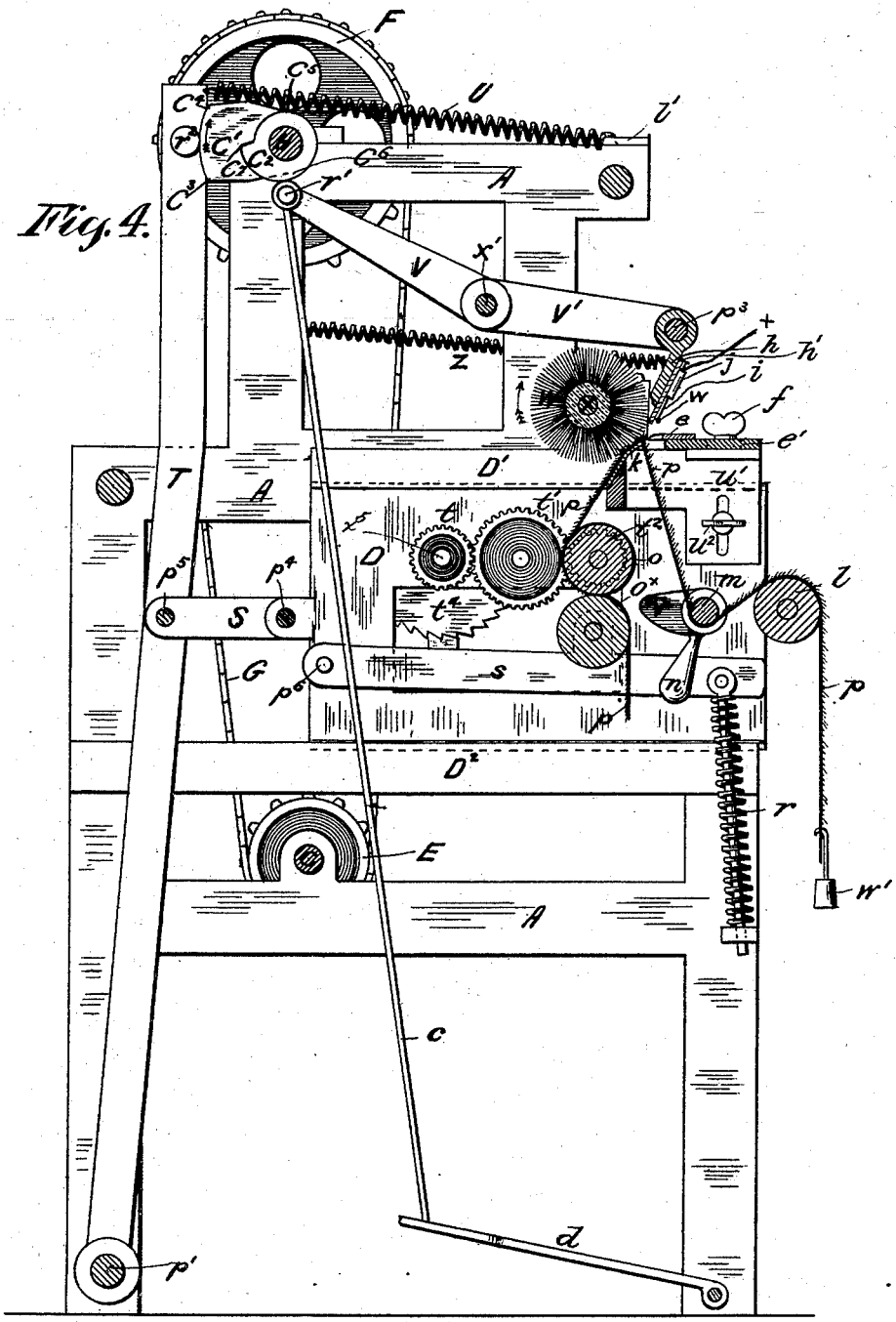
Figure 5:
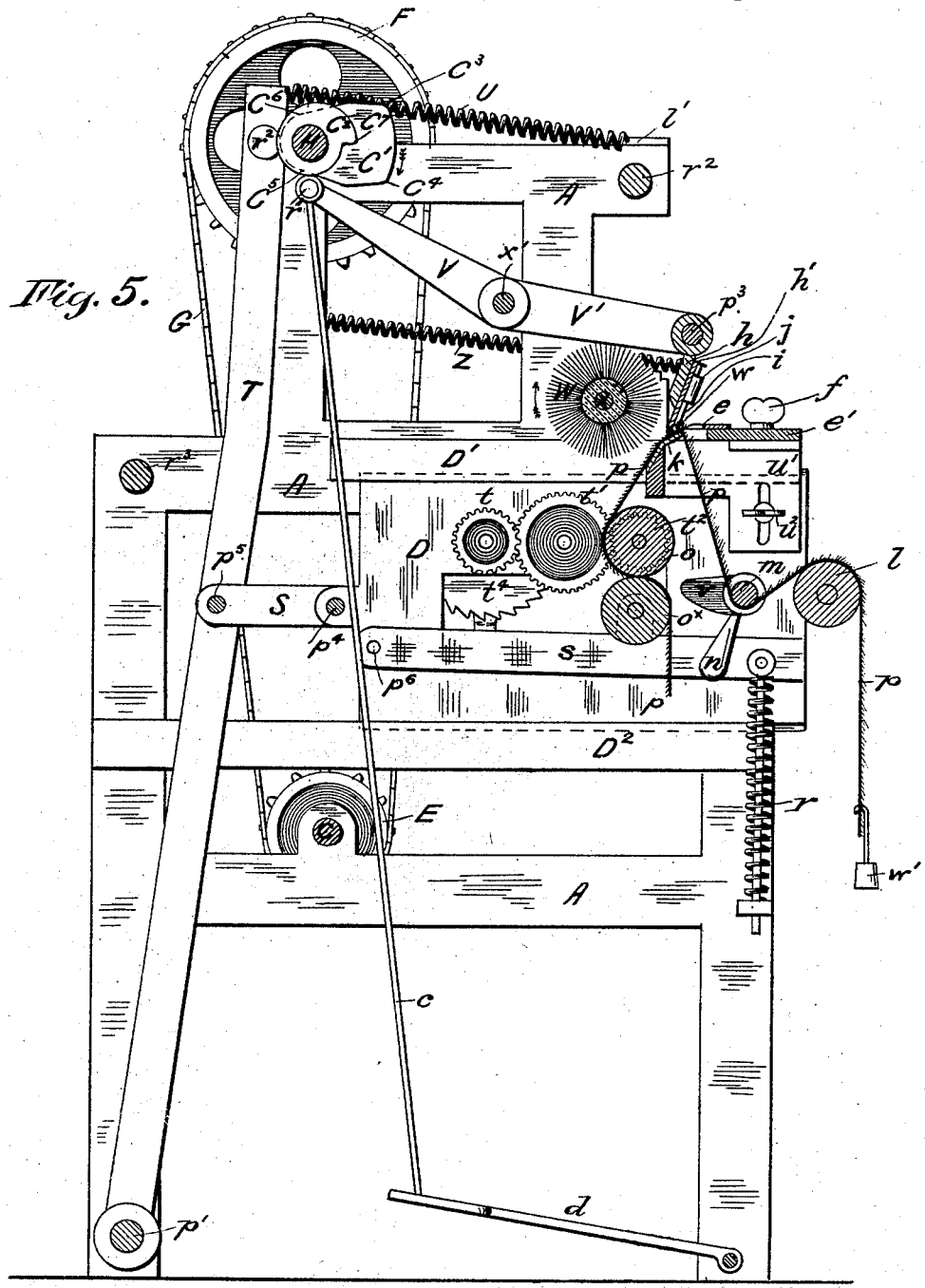
Figure 6:
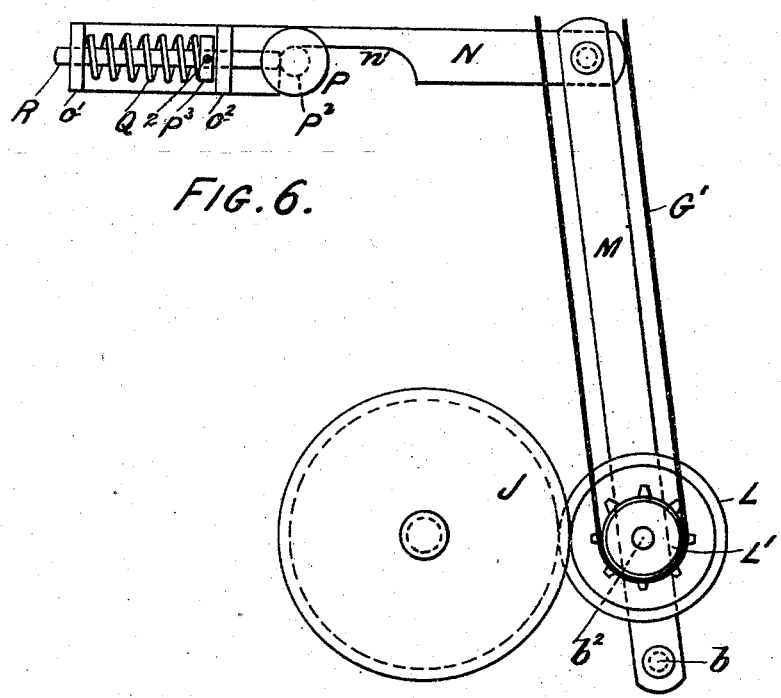
Figure 7:
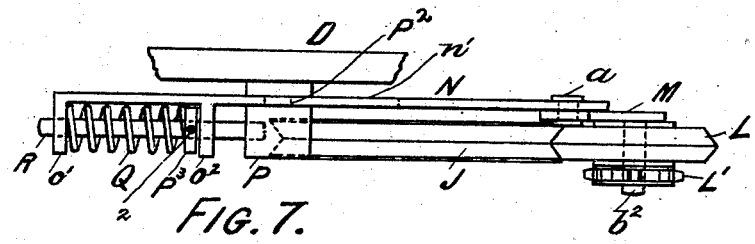

In the accompanying drawings, illustrating my invention in the several figures of which like parts are designated by similar letters and numerals of reference:—Figure 1, is an end elevation of my improved machine, looking at that end to the left of the operator. Fig. 2, is a similar view of the other end of the machine. Fig. 3, is a front elevation. Fig. 4, is a sectional elevation showing the position of the movable parts during the brushing operation. Fig. 5, is a similar view showing the position of the movable parts when the brush has ceased to rotate and the incandescent wire is in position to remove the water hairs. Figs. 6, and 7, are details of the mechanism for intermitting the motion of the brush.

A is the frame, B is the main driving wheel and C its shaft which extends through the frame and carries at its other end the sprocket wheel E which by means of the chain G drives the sprocket wheel F, and with it the shaft H, and the cams C', C', and C².

D. D. is a reciprocating frame working in slides D' D², fastened to the frame A, as shown. This frame is moved forward and back by the links S, S, attached to framed levers T, T, which carry at their upper ends rolls $r^2$ tightly pressed against the cams C' C' by the springs U, U, so that as the cams C' C' revolve, the levers T, T, following them, force the frame D, D, back and forth by means of the links S, S. Cams C' C' are of such shape, (see Figs. 4 and 5,) that at their extreme forward and backward positions the frame D, D, will be motionless for a short period of time, as will be more fully described hereinafter. The object of this is, first, to hold the pelt in contact with the brush until the fur is thoroughly brushed down and away from the knife-edged bar, leaving nothing but the water hairs standing thereon; and secondly, during the operation of removing the water hairs, to hold the pelt in position long enough to enable the incandescent wire to do its work thoroughly.

W, designates an intermittently revolving brush, supported in adjustable boxes $g, g$, upon the front of the frame A, as shown particularly in Fig. 3, so that the brush can be adjusted up or down relatively to the knife-edged bar $k$. The boxes $g, g$, are held in place upon the frame A, by bolts 1 1. These bolts pass through elongated holes 3, 3, in the boxes, thus permitting of the aforesaid adjustment. (See Fig. 3.) The intermittent motion of this brush W, is obtained by the following mechanism: Attached to the shaft C, (Fig. 1,) is the gear I, meshing in the pinion K, which carries a grooved friction-wheel J, in suitable bearings on the frame A. Pivoted to the frame A, at $b$, I arrange a lever M, carrying near its lower end and in line with the friction wheel J, a friction wheel L, and a chain wheel L', set loosely on a stud $b^2$. At the upper end of the lever M, and pivoted to it at $a$, is a rod N. This rod is notched as shown $n'$, the notch resting in a recess $p^2$ in a stud P, which is attached to the sliding frame D, D. On the outside of the rod N, are projections $o'$ $o^2$, through which a pin R, passes. The inner end of this pin R, rests in and against the stud P, and between the projections $o'$ $o^2$, and coiled around the pin R, I arrange a compression spring Q, bearing at one end against the projection $o'$ and at the other end against an adjustable stop $P^3$, the said stop being fastened to the pin R by a set screw 2 Figs. 6 and 7. The action of this mechanism which is particularly shown in Figs. 6 and 7, is as follows: When the machine is in the position shown in Figs. 1, and 4, the stud P, has been carried backward by the frame D, carrying with it the pin R, and compressing the spring Q, against the projection $o'$ and thus imparting motion to the rod N, which in turn swings the lever M backwardly and forces the friction wheel L, tightly against and in the groove of the friction wheel J, which is continually revolving. By this means a rotary motion is imparted to the friction wheel L, and sprocket wheel L' which motion is communicated by the chain G' to the sprocket wheel $L^2$, thus revolving the brush W. When the frame D, is in the position shown in Fig. 5, the reverse action of this mechanism has taken place. When the frame D, moves back, it releases the pin R, and compression spring Q, and the friction wheel L is moved forward and away from contact with the friction wheel J, and the brush W ceases to rotate and remains stationary until the friction wheels L and J are again brought in contact, and so on. The spring Q, allows a flexible contact to be made between the friction wheels L, and J, and this spring can be adjusted, if need be, by changing the position of the adjustable stop $P^3$ on the pin R so as to hold wheel L against wheel J with any desired degree of pressure, and also compensate for lost motion which may take place.

I will now proceed to describe the mechanism for stretching and intermittently feeding the pelt or skin $p$, over the knife-edged bar $k$. In Figs. 1, 4, and 5, are shown, attached to and carried by the reciprocating frame D, D, and having suitable bearings therein, rolls $l, m$, and $o$. Roll $l$ is loose and rests in bearings $b'$ $b'$ on the front edge of the frame D; roll $m$, has a cam shaped piece $v$, at each end and a handle $n$, at one end. The rolls $o$ $o^\times$ carry at one end a pair of gears $t^2, t^3$, as shown in Fig. 1, and the roll $o^\times$ has its bearing on two levers $s, s$, one at each end of the machine. These levers are pivoted to the reciprocating frame D, at $p^6$, and their forward ends are supported and pressed upward by the compression springs $r, r$. When the cams $v, v$, are turned by means of handle $n$, the levers $s, s$, are depressed against the pressure of the springs $r, r$, carrying with them the roll $o^\times$.

On the frame D, and having bearings therein and meshing with gear $t^2$ is a gear $t'$, and meshing with $t'$ is a gear $t$.

On the outer end of the axis $x^5$ of gear $t$, and on the outside of the frame, (Fig. 2,) I arrange a ratchet wheel $t^4$, and dependent from the axis $x^5$ an arm $x^2$ carrying a spring pressed pawl $y$, pivoted at $y^3$. There is also a stop pawl $y'$, pivoted at $y^2$, to the reciprocating frame D, as shown. The lower end of the arm $x^2$, is connected to the frame A, by the link $z$, pivoted at $x^4$ and $x^3$.

To insert a skin or pelt $p$ in the machine the levers $s, s$, are depressed by the cams $v, v$, unmeshing gears $t^2$ and $t^3$ and opening a space between rolls $o, o^\times$. It should be stated that the roll $o$, is rough on the surface, being covered with sandpaper or any other suitable material. The pelt or skin is passed over the roll $l$, under the roll $m$, up and over the knife-edged bar $k$, and down and between rolls $o$, and $o^\times$. The cams $v, v$, are then rotated and levers $s, s$, are forced upward by the pressure exerted by the springs $r, r$, and the roll $o^\times$ tightly pressed against the pelt $p$, thus holding it firmly between rolls $o, o^\times$; at the same time the gears $t^2$ and $t^3$ are thrown into mesh. Weights $w'$ $w'$, are hung on the front end of the skin as shown in Fig. 4, and serve to keep it stretched tight. As the frame D moves back and forth, at each movement backward or away from the operator the arm $x^2$ is pulled back by the link $z$ and the spring pressed pawl $y$, pulls the ratchet wheel $t^4$ ahead one tooth, and the ratchet wheel $t^4$ by means of the train of gears $t, t', t^2$, moves the roll $o$, ahead a small distance, and the skin $p$, being tightly grasped between the rolls $o, o^\times$, is pulled upward and over the knife edged bar a small distance. The stop pawl $y'$, prevents the ratchet wheel from turning back when the frame D, is moving in and the spring pawl $y$, is slipping from one tooth to the next.

By this means the pelt or skin p, is slowly and intermittently fed over the knife edged bar k, only a small portion of the surface of the skin being presented on top of the bar at each feed. If at any time it is necessary to stop the feed of the skin this is also accomplished by the cams v, v, which separate the rolls o, o$^x$, and throw gears t$^2$ and t$^3$ out of mesh, thereby preventing the feed of the skin forward.

In Figs. 1, 4, and 5, is shown the knife-edged bar k, attached to the upper face of the reciprocating frame D, by the adjustable plates u', u', adjustable vertically by means of the thumb screws u$^2$. Upon the upper face of u' u' is the adjustable plate e' carrying a guard comb e, preferably serrated; this plate e' is horizontally adjustable by means of the thumb screws f, f. All of these adjustments of the knife-edged bar k, comb e, and brush w, are for the purpose of permitting the operator to set and adjust them from time to time when necessary as the skin to be operated upon varies in character and thickness. The guard comb e, is always set up closely against the skin or pelt p.

The incandescent conductor or wire w, which, as stated, is the means I prefer to employ for removing the stiff water hairs, is supported and operated as follows:—To the shaft x' are adjustably secured by set screw 4, Figs. 1 and 2 lever arms V, V', V', the outer end of arm V, carrying a roll r' which is in contact with a cam c$^2$ on the shaft H. A shaft p$^3$ has its bearings in the outer ends of the arms V' V' and from this shaft arms h, h, depend carrying a plate h'. On the front face of this plate, insulated supports j, are arranged, through which pass little supporting wires i, for the tense incandescent conductor w, serving to hold the same in a horizontal position. The ends of the conductor w, are suitably connected to a source of electricity by which the conductor is rendered incandescent when desired. During the forward movement of the frame D, the plate h' and with it the wire w is raised up vertically by the cam c$^2$ as shown in Fig. 4, thus allowing the knife-edged bar k, comb e, and pelt p, to pass under it freely. When the frame D, moves forward and toward the operator the plate h' descends and brings the incandescent conductor w, to such a height over the knife-edged bar that the stiff water hairs standing thereon are brought in contact with said conductor (see Fig. 5), and are singed or burned off, and this operation is repeated at each forward and backward movement of the frame D. The foot treadle d, by means of the connecting rod c, serves to raise the plate h' up and out of the way at any time it may be necessary so to do, and the plate h' if raised high enough will rest in a notch on top of stop s' as shown in Fig. 2 and will be held there by spring Z until removed therefrom by the operator, thus leaving the operator free to adjust the machine. This mechanism may also be employed to raise and hold the incandescent conductor away from the fur while a new skin is being inserted in the machine, or a finished one is being taken out.

The operation of this machine is as follows: A pelt having first been introduced in the manner stated, and the incandescent conductor raised up, power is applied and the reciprocating frame moves away from the operator carrying the knife-edged bar, over which the pelt is stretched, toward the brush, until the pelt is in contact with the brush, which has commenced to rotate as frictional contact is made between the wheels J, L, which occurs just before the pelt is brought in contact with the brush. At this time by the combined action of the guard-comb on one side of the knife-edged bar, through which the pelt is fed, and the brush on the other side, the fur is parted on top of the knife-edged bar and nothing but the stiff water hairs which spring through the comb on the one side and will not brush down on the other, are left standing upon the top of the bar. This operation lasts for a few seconds of time during which the reciprocating frame is stationary, (see Fig. 4,) until the corners C$^3$ of the cams C' C' pass the rolls r$^2$. In other words, during the period of time that that portion of the cams between C$^3$ and C$^4$ is in contact with the rolls r$^2$, the springs U, cannot operate to move the framed levers T, and the frame D is stationary. Then when the portions C$^3$ of the cams pass the rolls r$^2$ the frame D, commences to move toward the operator, moving slowly at first and then more rapidly as the converging portions of the cams come in contact with the rolls. As the frame moves away from the brush it carries with it the knife-edged bar over which the pelt is stretched and the guard-comb, at the same time breaking the frictional contact between the wheels J, L, and the brush ceases to rotate. As this last operation takes place, the cam C$^2$ which is on the same shaft as the cams C', has released the lever arm V, and permitted the plate carrying the incandescent conductor to drop and bring said conductor in contact with the stiff water hairs standing erect upon the knife edged bar. At this point in the operation of the machine the frame D, is again stationary for a few seconds of time, as the framed levers T, will not be actuated to move the frame D, while that portion of the cam C' between C$^5$ and C$^6$ is in contact with the rolls r$^2$ (see Fig. 5). As the converging sides of the cams at about the point C$^5$ come in contact with the roll r$^2$ the framed levers T, are gradually moved against the tension of the springs U, gradually at first and then faster, until C$^4$ comes in contact with the rolls r$^2$ when the motion ceases. At the same time that motion is imparted to the levers T, the projection C$^7$ on the cam C$^2$ comes in contact with the roll r' actuating the levers V, V', V' and instantly raising the plate carrying the incandescent conductor, so that the knife-edged bar, (over which the pelt is stretched,) and guard comb, can move under the conductor, toward the brush, and the feed mechanism can operate to present a new section of the pelt on the knife-edge, without bringing any portion of the pelt in contact with the conductor.

It will be seen that all the parts of this machine work automatically and with such relation to each other, that the pelt will be fed and a new section be presented on the knife-edged bar just before the brushing action commences, and as the pelt is moved away from the brush, the brush ceases to rotate and the incandescent conductor is lowered and removes the water hairs standing on the knife-edged bar by singeing or burning. This operation continues until the entire pelt has been treated and all the water hairs removed.

The object of intermitting the motion of the brush is to prevent any air current, however small, from being produced during the time when the incandescent wire is in operation, because in a machine of this character it is essentially necessary to keep the wire or conductor in a uniform state of incandescence and any air current would tend to cool the wire. Obviously, when the brush is rotating in contact with the pelt no air could be produced which would affect the incandescent wire, which at this point in the operation of the machine is shielded by its carrying plate.

It is obvious that other feeding mechanism and other means for intermitting the motion of the brush might be employed without departing from the principle of my invention, as such changes would be the work of a mechanic and not require invention.

What I claim as my invention, and desire to secure by Letters Patent, is—

1. A machine for removing the stiff water hairs from pelts, comprising a frame carrying a knife-edged bar and a guard comb arranged in front of said bar, means for stretching and intermittently feeding the pelt over said bar, and means for imparting a reciprocating motion to said frame, in combination with a brush arranged back of the knife-edged bar and opposite to the comb, means for causing the brush to rotate intermittently and means for removing the water hairs, substantially as described.

2. A machine for removing the stiff water hairs from pelts, comprising a frame carrying a knife-edged bar, means for stretching and intermittently feeding the pelt over said bar, and means for imparting a reciprocating motion to said frame, in combination with a brush arranged back of the knife-edged bar, means for causing the brush to rotate intermittently, and means for removing the water hairs, substantially as described.

3. A machine for removing the stiff water hairs from pelts, comprising a frame carrying a knife-edged bar and a guard comb, means for stretching and intermittently feeding the pelt over said bar and means for imparting a reciprocating motion to said frame, in combination with a brush, means for causing the brush to rotate intermittently and an incandescent conductor in the form of a tense wire and means for causing the conductor to oscillate intermittently, substantially as described.

4. In a machine for removing the stiff water hairs from pelts, intermittent feeding mechanism for the pelt, comprising a ratchet wheel in connection with a train of gears operating feeding rolls, in combination with a reciprocating frame and spring pressed pawls and means for actuating the pawls, thereby intermittently rotating the ratchet wheel a predetermined amount, substantially as described.

5. In a machine for removing the stiff water hairs from pelts, a brush, and mechanism for intermittently rotating the same, consisting of the friction wheels J and L, the sprocket wheels L' and L², and the sprocket chain G', in combination with driving mechanism and means for moving said friction wheels into and out of frictional contact, substantially as described.

6. In a machine for removing the stiff water hairs from pelts, the combination of a knife-edged bar, means for stretching and intermittently feeding the pelt over said bar, a brush at one side of said bar, means for causing the brush to rotate intermittently, and an incandescent conductor in the form of a tense wire, and means for causing the conductor to oscillate intermittently, substantially as described.

In testimony whereof I have hereunto signed my name, in the presence of two witnesses, this 12th day of April, 1890.

EDWARD R. KNOWLES.

Witnesses:
THORNE S. WALLING,
ERNEST C. WEBB.